(12) United States Patent
Estes et al.

(10) Patent No.: US 9,152,487 B2
(45) Date of Patent: Oct. 6, 2015

(54) SERVICE OUTAGE DETAILS IN AN ERROR MESSAGE

(75) Inventors: Chad Steven Estes, Woodinville, WA (US); Thomas Ernest Osborne, Philadelphia, PA (US); Rahul Sudhir Kumar, Kirkland, WA (US); Gil Mcquillan, Austin, TX (US); Gupta Garuda, Redmond, WA (US); Jamie Joe Marconi, Bellevue, WA (US); Ionut Ciprian Gradinaru, Sammamish, WA (US); Jiong Ouyang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 13/249,813

(22) Filed: Sep. 30, 2011

(65) Prior Publication Data
US 2013/0086194 A1 Apr. 4, 2013

(51) Int. Cl.
G06F 15/16 (2006.01)
G06F 11/07 (2006.01)
G06F 11/30 (2006.01)
G06F 11/32 (2006.01)

(52) U.S. Cl.
CPC .......... *G06F 11/0709* (2013.01); *G06F 11/079* (2013.01); *G06F 11/0769* (2013.01); *G06F 11/3006* (2013.01); *G06F 11/32* (2013.01)

(58) Field of Classification Search
CPC .................................................. G06F 11/0769
USPC ....................................................... 709/207
See application file for complete search history.

(56) References Cited

U.S. PATENT DOCUMENTS

| 5,909,215 A * | 6/1999 | Berstis et al. .................. 715/781 |
| 6,438,716 B1 | 8/2002 | Snover |
| 6,526,529 B1 * | 2/2003 | Miksovsky et al. ............. 714/57 |
| 6,556,659 B1 | 4/2003 | Bowman-Amuah |
| 6,565,608 B1 * | 5/2003 | Fein et al. ...................... 715/255 |
| 7,461,297 B2 | 12/2008 | McLellan et al. |
| 7,568,002 B1 * | 7/2009 | Vacanti et al. ................ 709/203 |
| 7,861,106 B2 * | 12/2010 | Avizienis .......................... 714/2 |

(Continued)

OTHER PUBLICATIONS

Dollard, Kathleen., "Calling WCF Services in Silverlight 4", Retrieved at <<http://visualstudiomagazine.com/articles/2010/07/01/calling-wcf-services-in-silverlight-4.aspx>>, Jul. 1, 2010, pp. 5.

(Continued)

*Primary Examiner* — Hamza Algibhah
(74) *Attorney, Agent, or Firm* — Aaron Chatterjee; Kate Drakos; Micky Minhas

(57) ABSTRACT

One or more techniques and/or systems are disclosed for providing a customized service error message to a user of a service. An error encountered during a user action related to the service may be compared to one or more identified service outages to determine if the error may be attributable to any of the service outages. If the error may be caused by one or more of the identified service outages, the customized service error message can be provided, where the customized service error message comprises information about one or more of the identified service outages that cover the error. The customized service error message may be displayed to the user so that the user knows that the error is server/service side (e.g., as opposed to an issue on the user's local device), a timeframe within which the error is expected to be resolved, etc.

20 Claims, 9 Drawing Sheets

(56) References Cited

U.S. PATENT DOCUMENTS

| | | | |
|---|---|---|---|
| 7,971,103 B2 | 6/2011 | Brugler et al. | |
| 8,010,850 B2* | 8/2011 | Kruse et al. | 714/57 |
| 2005/0188273 A1* | 8/2005 | Angelo et al. | 714/39 |
| 2007/0157116 A1* | 7/2007 | Johnson et al. | 715/808 |
| 2007/0204012 A1* | 8/2007 | Kruse et al. | 709/219 |
| 2009/0006884 A1* | 1/2009 | Cahill et al. | 714/4 |
| 2009/0037724 A1* | 2/2009 | Carion et al. | 713/100 |
| 2010/0157964 A1* | 6/2010 | Yoon | 370/338 |
| 2011/0078519 A1* | 3/2011 | Yordanov et al. | 714/57 |
| 2011/0191630 A1* | 8/2011 | Li et al. | 714/25 |
| 2012/0036402 A1* | 2/2012 | DeLuca | 714/57 |
| 2012/0246334 A1* | 9/2012 | Yang et al. | 709/232 |

OTHER PUBLICATIONS

"QServiceContext Class Reference", Retrieved at <<http://doc.qt.nokia.com/qtmobility-1.2/qservicecontext.html#details>>, Retrieved Date: Sep. 15, 2011, pp. 3.

"Herdict Web—The verdict of the herd", Retrieved at <<http://www.herdict.org/about/9>>, Retrieved Date: Sep. 15, 2011, pp. 5.

"Downrightnow", Retrieved at <<http://downrightnow.com/about>>, Retrieved Date: Sep. 15, 2011, pp. 1.

\* cited by examiner

100

102

The page cannot be displayed

There is a problem with the page you are trying to reach and it cannot be displayed.

Please try the following:

- Click the Refresh button or try again later.
- Open the file:// home page, and then look for links to the information you want.
- If you believe you should be able to view this directory or page, please contact the Web site Administrator by using the e-mail address or phone number listed on the file:// home page.

10060 - Connection timeout

104

HTTP Error 404 Not Found

The Web server cannot find the file or script you asked for. Please check the URL to ensure that the path is correct.

Please contact the server's administrator if this problem persists.

106

The page cannot display the page       HTTP 500

Most likely causes:
- The website is under maintenance.
- The website has a programming error.

What you can try:
- Refresh the page.
- Go back to the previous page.

More information

FIG. 1

SERVICE OUTAGE DETAILS IN AN ERROR MESSAGE

BACKGROUND

Online services and/or web-based applications may be accessed by network connected users, such as connected to the Internet. Some services may be used by a large number of users, and may utilize vast amounts of resources, such as hardware and software to provide the services to the users. These services may comprise multiple data centers, respectively comprising many (e.g., thousands of) servers and many (e.g., hundreds of) hardware/network components. Operations comprised on this scale may often have many small-scale, localized, partial outages, for a variety of reasons. Hardware outages may comprise storage disk failures, server crashes, network switches and/or other hardware failures, for example. Further, small-scale, localized software failures may occur that can affect a portion of users utilizing one or more of the services, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Unless there is a large scale impact affecting a significant proportion of users of an online service, a majority of online service providers typically display a default/generic error message to affected users when a service outage occurs, for example. Often, for example, there may be no indication as to specifics related to the service outage. For example, there is usually no indication that the outage is being resolved and/or a possible resolution time-frame. Lack of communication during these types of outages may cause a reduced user experience.

Accordingly, one or more techniques and/or systems are disclosed where a customized error message may be provided to a user regarding a service outage, where the customized message provides more details about potential causes, responses, and/or remedies, for example. Service outages for one or more services can be monitored, and if an error is detected during a user action, details of the error can be compared to any current service outages. If the error is covered by one or more identified service outages, details of the service outage may be provided in a customized error message to the user. Further, the customized error message may be provided to the user merely if the service outage actually affects the user.

In one embodiment for providing a customized service error message to a user of a service, one or more service outages for the service can be identified. An error encountered during a user action may be detected, and it can be determined whether the error is covered by one or more of the identified service outages for the service. If the error is covered by the one or more identified service outages, the customized service error message can be provided to the user, where the customized service error message is based upon information related to the one or more identified service outages that cover the error.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 1 illustrates an example embodiment of common error messages displayed to users.

DETAILED DESCRIPTION

Figure 2:
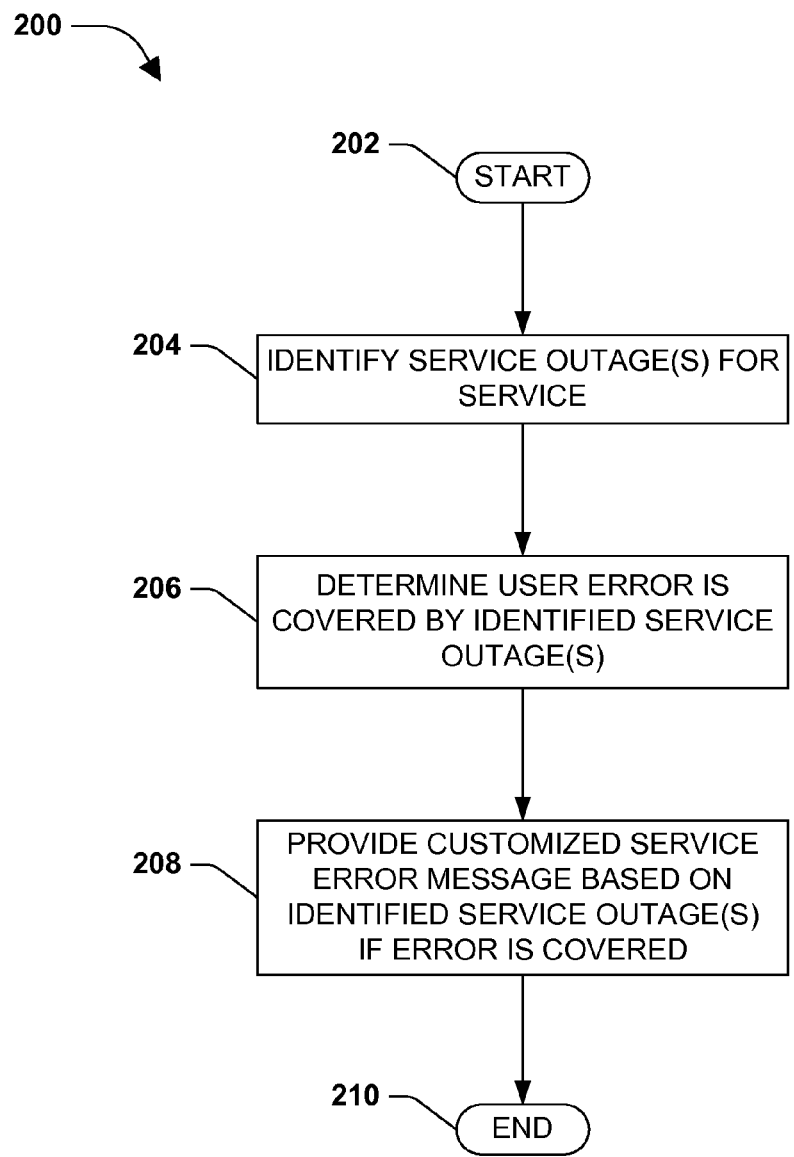
FIG. 2 is a flow diagram illustrating an exemplary method for providing a customized service error message to a user of a service.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Typical large-scale, online applications, such as a web-based email service, operate on a massive scale, spanning multiple data centers with many (e.g., thousands of) servers and many (e.g., hundreds of) hardware/network components. Operations at this scale can have many small-scale, localized, partial outages at any time, for example, due to a variety of reasons, such as hard disk failures, server crashes, network switches and/or other hardware failures, for example. Typically, unless there is a large scale impact affecting a significant portion of the users of the service, most online service providers merely provide a default/generic error message to the affected users. Often, there is little indication to the users that the error was caused due to a service outage. This lack of a more detailed communication during an outage may provide a less satisfactory user experience.

FIG. 1 illustrates an example embodiment 100 of common, generic error messages displayed to users. In the example embodiment 100, a first error message 102 merely mentions that the page for the service cannot be displayed, but does not specify why it cannot be displayed. Further, the example error message 102 merely offers generic solutions to the user. A second error message 104, merely tells the user that there is a problem displaying the page, and lists an error type, which the user may research to potentially identify the problem. In either case, the user is left with little knowledge as to why the service cannot provide the requested page, for example, and may need to do some additional research and/or contact an administrator to identify a potential problem and/or solution. The user may not know if the problem is local to their system (e.g., computer, network, etc.), or a remote problem (e.g., service outage, ISP problem, etc.).

In the example embodiment 100, a third error message provides some generic potential problems, noting that there might be a service outage and/or a programming error. Again, the message 104 offers some generic advice for a resolution, by refreshing the page and/or going back to the previous page. Further, the error message 104 has a link "more information" which may be selected by the user to navigate to another location for more information about the error. As an example, the link may take to user to a help page which describes the type of error (e.g., http 500), and some possible causes. However, typically, this type of information does not provide the user with enough information to determine the actual cause of the error.

As provided herein, a method may be devised that provides for displaying a more detailed service error message to a user of an online service. As an example, providing a more detailed service error message can addresses some of the communication problems described above. For example, when the user is impacted by an outage that causes an error, details of the outage can be displayed in a context of the error message. Information can be retrieved about the outage, such as its scope, functions impacted, latest status, approximate resolution time, etc. Further, merely those users that are actually impacted by a "partial" outage may be shown these details, for example.

FIG. 2 is a flow diagram illustrating an exemplary method 200 for providing a customized service error message to a user of a service. The exemplary method 200 begins at 202. At 204, one or more service outages can be identified for the service. As an example, an online service can comprise a plurality of connections, network switches, servers, storage hardware, and/or more, at various geographic locations (e.g., around a country and/or the world). At any particular time, one or more portions of the service may experience an outage, for example, due to a hardware/software failure, such as hard disk failures, server crashes, network switches and/or other hardware failures, and/or due to maintenance/upgrading of existing hardware/software, for example.

In one embodiment, current, active outages for the online service may be identified (e.g., periodically, continually, or at a specified time), for example, based on a variety of service health monitoring systems and/or other service operational systems. In this embodiment, for example, the current, active outages can be stored in an outage directory (e.g., in a stack with most recent outages on top), which may be accessed by one or more portions of the service to identify possible outages affecting users of the one or more portions.

At 206 in the exemplary method 200, it may be determined whether an error encountered during a user action may be covered by the one or more identified service outages. As an example, a user action may comprise initiating a portion of the online service (e.g., opening an application), interacting with one or more portions of the service (e.g., selecting an UI element on a page), requesting an action for the service (e.g., navigating to a webpage for the service), and/or requesting data comprised by the service (e.g., retrieving a file). It will be appreciated that the user action is not merely limited to the examples described herein, for example, the user action can comprise any user-related action that may cause the online service to perform a response action.

Further, as an example, if an appropriate service action cannot be performed in response to the user action an error may be encountered. For example, an error may be encountered if a portion of the online service attempted to be opened cannot be initiated, if a requested action cannot be performed, if requested data cannot be retrieved, and/or an element of the service cannot respond to a user interaction. In one embodiment, an error may be categorized into an error type (e.g., 10060 connection timeout in error 102 of FIG. 1), for example, which can be determined based on the user action and/or the resulting service response (e.g., or lack thereof).

In one embodiment, the one or more identified service outages can be reviewed to determine if any one or more of the one or more identified service outages may be a cause of the error, for example, based on the error type. As an example, a service outage comprising a network connection failure (e.g., switch failure) may be a possible cause of an error resulting from no response from a requested server (e.g., 10060 connection timeout error 102 of FIG. 1, and a HTTP 504 gateway timeout error, amongst others). In this example, the network connection failure service outage may be considered to cover the error encountered during the user action. Further, as an example, at least one cause of the error encountered during the user action may be determined to be a result of the one or more identified service outages, and therefore may be covered by the one or more identified service outages.

At 208 in the exemplary method 200, if the error is determined to be covered by the one or more identified service outages, the customized service error message can be provided to the user based, at least, upon the one or more identified service outages. As an example, if the error is not determined to be covered by the one or more identified service outages for the service attempted to be used by the user, the error may comprise a local (e.g., local to the client used by the user) error for which service outage information may not be provided.

As another example, if the error is determined to covered by one or more of the one or more identified service outages, details of the service outage(s) covering the error can be retrieved (e.g., from the variety of service health monitoring systems and/or other service operational systems comprising the service). Further, in this example, the details of the service outage(s) covering the error can be included in the error message to the user, resulting in the customized service error message. In one embodiment, the customized service error message can be displayed to the user in an application User Interface (UI) for the service (e.g., in a browser).

Having provided the customized service error message to the user, the exemplary method 200 ends at 210.

Figure 3:
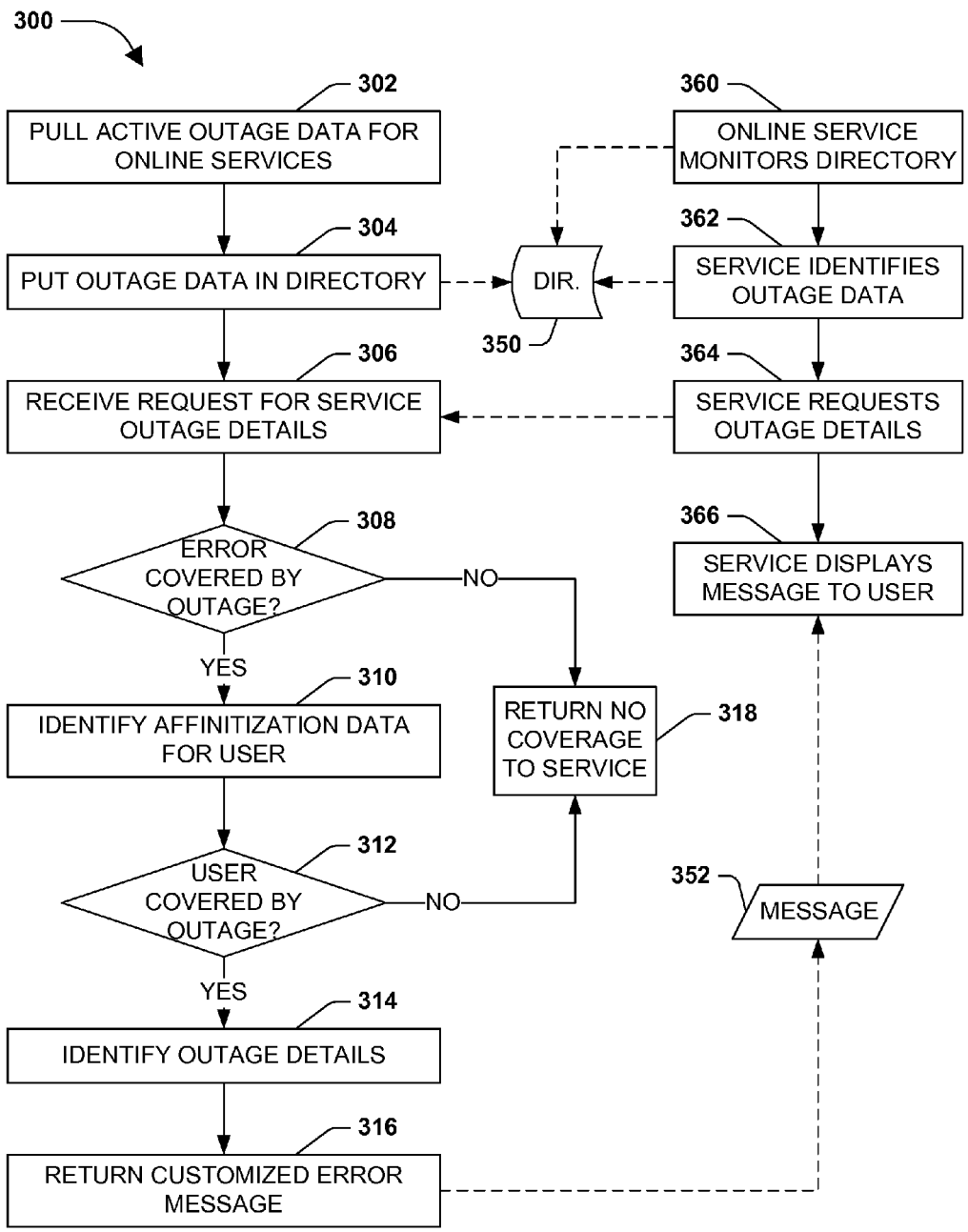
FIG. 3 is a flow diagram illustrating an example embodiment where one or more portion of one or more techniques described herein may be implemented.

FIG. 3 is a flow diagram illustrating an example embodiment 300 where one or more portion of one or more techniques described herein may be implemented. At 302, current, active outage data can be pulled for one or more online services (e.g., or portions of an online service). As an example, a collection of online services (e.g., and/or an online service comprising a plurality of sub-services) may comprise one or more "health" monitoring systems and/or other operational systems that can identify possible service outages, for example. In one embodiment, the active outage data can be pulled from the monitoring systems periodically (e.g., at desired intervals), for example, which may comprise one or more service outages for one or more of the monitored online services. As an illustrative example, if a backend server for a first system crashes, and a storage disk from second service is damaged, the monitoring systems may comprise this outage information, which can be pulled at a particular time.

At 304, the pulled outage data can be put into a directory 350 of service outages for the one or more online services being monitored. As an example, the directory may comprise a stack where more recent information in located at a top of the stack (e.g., LIFO). In this example, more recent service outage information may be placed on the top of the stack, such as data retrieved from a most recent pulling of outage data from the monitoring systems. At 360, the directory 350 can be monitored by the respective one or more online services, for example, for service outage data that may comprise information referencing a system utilized by the online service.

That is, for example, an online service can monitor the directory 350 to identify when a new service outage is added that includes hardware and/or software utilized by the online service. As an example, a service outage report may comprise a summary of one or more systems affected and/or one or more services (or portions thereof) affected by the by outage. At 362, an online service may identify service outage data (e.g., an outage summary) in the directory 350 that could affect the online service. At 364, the online service can send a request for more details about the identified service outage, for example, in an effort to determine if the online service is affected by the outage, what may be the cause of the outage, and/or possible resolutions for the outage, for example.

In one embodiment, the request for outage details may be triggered by an error encountered during a user action involving the online service. As an example, a user may be performing the user action by interacting with the online service (e.g., opening a web-application, requesting data, navigating to a portion of the online service, etc.) when an error is detected (e.g., the service cannot respond appropriately to the user action). In this embodiment, the online service may send the request for service outage details when the error is detected, for example, and the request may comprise the detected error and/or the service outage data identified in the directory 350.

At 306 in the example embodiment 300, the request for service outage details can be received, such as at a service that can provide service outage details. At 308, it may be determined whether the error is covered by one or more service outages identified for one or more online services for which active outage data has been pulled (e.g., at 302). In one embodiment, as described above (e.g., at 206 of FIG. 2), an error may be covered by a service outage if the service outage may be a potential cause of the error, and/or if an error type for the error may be one that may be caused by the service outage.

If the error is determined not to be covered by the one or more service outages (NO at 308) a response can be returned to the requesting online service that indicates the error is not covered by identified service outages, at 318. If the error is determined to be covered by the one or more service outages (YES at 308) affinitization data may be identified for the user, at 310. As an example, affinitization data may comprise a tendency and/or preference of the user to utilize particular services (or portions thereof) and/or access data that is resident on particular clusters of service devices. In one embodiment, the affinitization data may comprise a location of service related data utilized by the user and/or a location of one or more portions of the service utilized by the user. For example, a location of service related data may comprise a particular data center (e.g., or portion of the data center), utilized by the online service, that is located close to the user. Further, for example, a location of one or more portions of the service may comprise a network operations center (NOC) (e.g., or a portion of the NOC) that provides the services typically used by the user, and/or may be located in a vicinity of the user, for example.

In one embodiment, the affinitization data identified for the user may be used to determine whether the user is affected by a service outage. As an example, the type of affinitization data described above may be cross-referenced with the service outage data to determine whether the user may be affected by one or more of the service outages that cover the error. At 312, it may be determined whether the user is covered or affected by one or more of the services outages that cover the error. In one embodiment, determining whether the user is affected by one of the one or more identified service outages can comprise determining that the service outage impacts the identified location of the service related data utilized by the user, and/or the location of the one or more portions of the service utilized by the user.

If it is determined that the user is not covered or affected by at least one of the one or more identified service outages (NO at 312), a response can be returned to the online service comprising an indication that the user may not be covered by an identified service outage (e.g., the error may be attributable to something local to the user, such as hardware and/or software issues on the laptop, desktop, etc. of the user, for example). If it is determined that the user is covered by at least one of the one or more identified service outages (YES at 312), details of the one or more service outages covering the user may be identified, at 314. In one embodiment, information about a service outage may comprise a scope of the service outage (e.g., what hardware, services and/or data storage may be causing the outage), one or more functions that may be impacted by the service outage (e.g., service, data retrieval, particular actions, etc.), a status of the service outage (e.g., identified, being reviewed, under repair, resolved, etc.), and/or an approximate resolution time for the service outage (e.g., how long until the outage is fixed). As an example, the information about a service outage can be retrieved from the active outage data pulled for the one or more online services being monitored.

Figure 5:
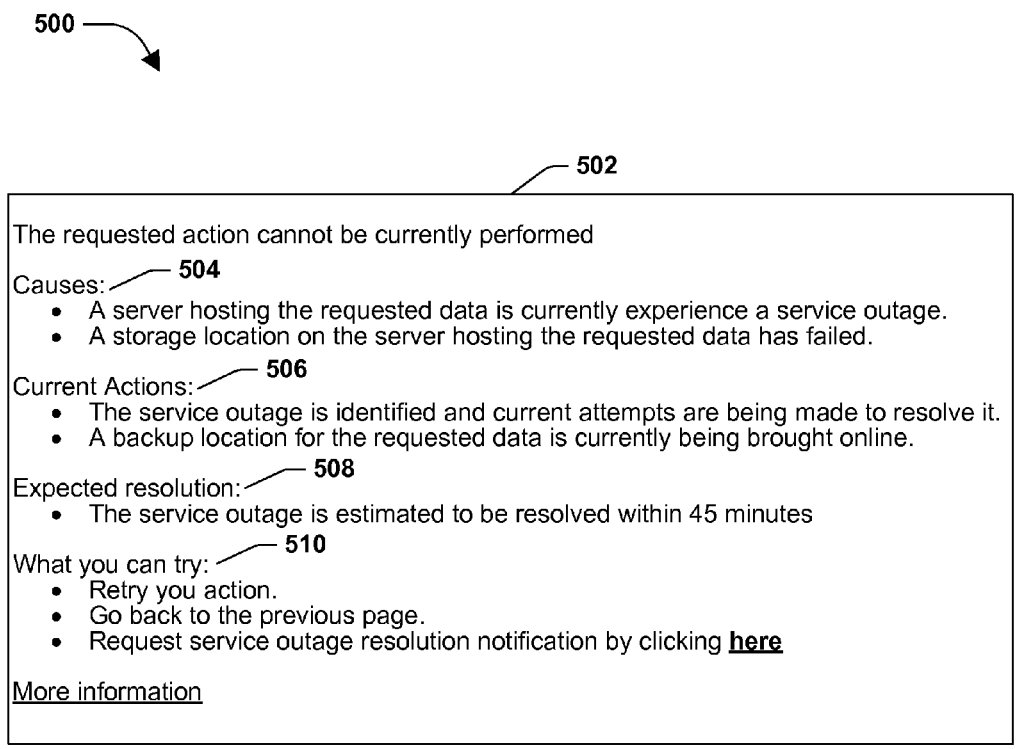
FIG. 5 illustrates an example embodiment of a customized error message which may be provided to a user.

At 316 in the example embodiment 300, information about a service outage, which may be included in a customized error message 352 to the user, can be returned to the online service, for example, in response to the service outage request from the online service. As an illustrative example, FIG. 5 illustrates an example embodiment 500 of information that may be used for a customized error message, which may be provided to a user. In this example 500, the information in the error message 502 comprises possible causes 504 of the error, identifying that the server hosting the data requested is out, and that a particular storage location (e.g., for the host server) has failed.

Further, current actions 506 (e.g., a status) that may be under way to resolve the outage can be provided. In this example, the user is notified that the outage has been identified, attempts are being made to resolve it, which includes utilizing a backup location for the requested data. An expected outage resolution 508 notice can be provided, which may let the user know when the outage may be resolved. Additionally, possible user actions 510 can be provided, which may give the user error response options. In one embodiment, one of the user response options may comprise requesting a service outage resolution notification. As an example, when the service outage that covers the error for the user is resolved a notice of resolution can be sent to those users that have requested the notification. In this way, for example, the user may be able to move onto other actions instead of having to continue to attempt the user action, during which the error was encountered, in hopes that it was resolved. That is, the users will be notified with the service outage is resolved and the service is once again available, and the users may thus engage in other activities instead of routinely "checking back" to see if the service is available.

At 366 in the example embodiment 300, the online service may display the customized error message 352 to the user, such as in a UI provided by the online service. Providing this type of detailed information to the user and/or providing for resolution notification, for example, may provide an enhanced user experience for an online service, by allowing the user to quickly determine a source of an error and/or a possible (time of) re-availability of the service.

In one aspect, when a service outage occurs that may affect a large number of online services and/or for which a large number of errors are detected, for example, an outage detection and response service may be overwhelmed with requests for outage details (e.g., 364 of FIG. 3). As an example, a collection of online services may comprise a plurality of services, utilizing a large amount of hardware distributed all over the country, accessed by millions of users. In this example, when an outage affects several of the services (e.g., a portion of a data center crashes), it may also affects thousands or millions of users. In this example, the outage detection and response service may receive a large amount of requests, which may, in-turn, cause the service to crash. In one embodiment, a request threshold may be utilized to mitigate potential overwhelming of an outage detection and response service.

Figure 4:
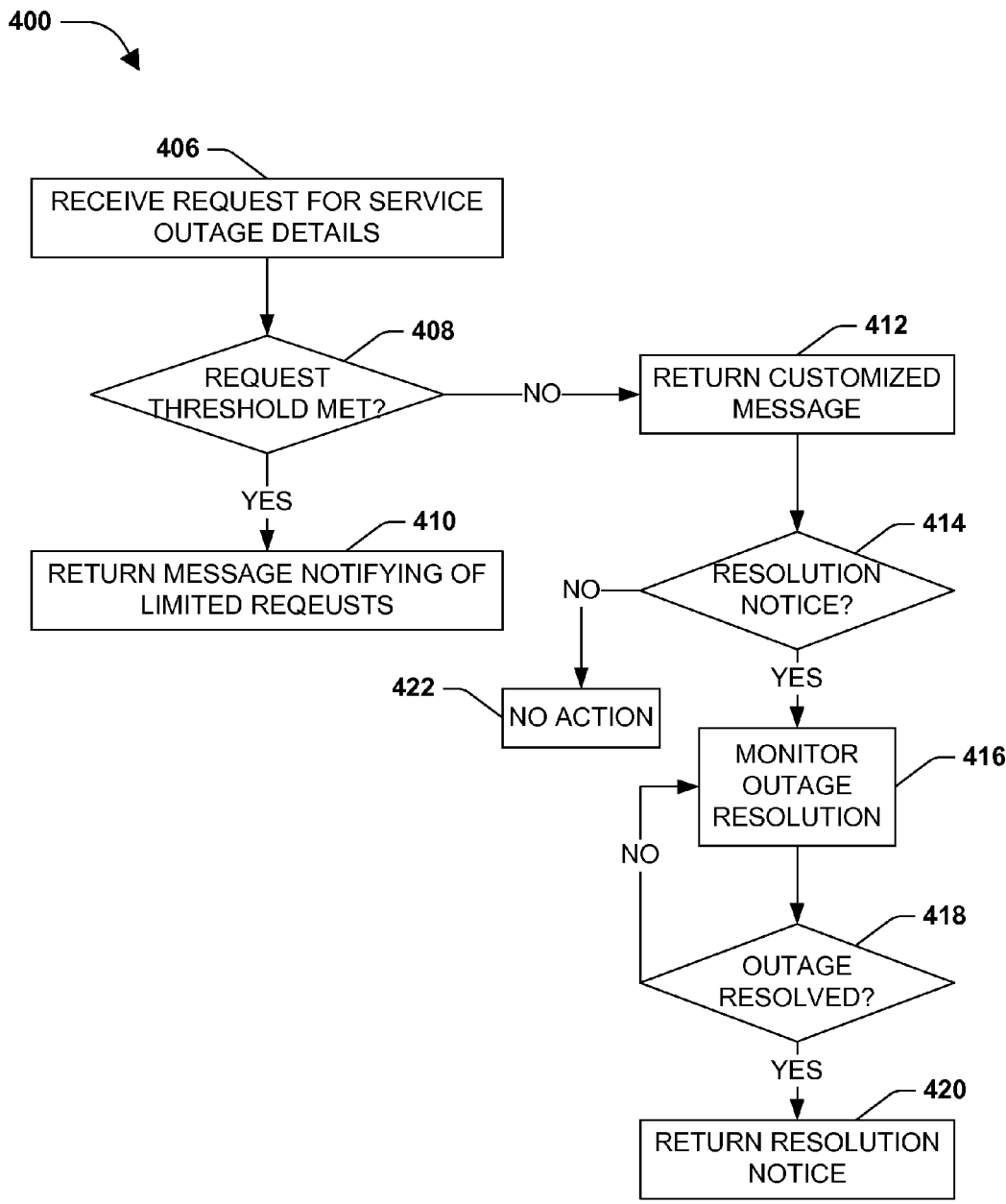
FIG. 4 is a flow diagram illustrating an example embodiment where one or more portion of one or more techniques described herein may be implemented.

FIG. 4 is a flow diagram illustrating an example embodiment 400 where one or more portions of one or more techniques described herein may be implemented. At 406, a request for service outage details can be received from an online service (e.g., for which an error was detected during a user action). In one embodiment, when one or more service outage requests are received, an outage request threshold may be applied. In one embodiment, the outage request threshold can comprise a number of outage requests that are received over a period of time (e.g., requests per second (RPS)). As an example, a number of RPS can be tracked, and when the RPS meets the outage request threshold the service may transition to an "alert" mode.

At 408, it may be determined if the outage request threshold has been met (e.g., the RPS has met or exceeded the threshold). If the outage request threshold is met (YES at 408), a response request can be returned to the online service, in response to the received request from the service. In one embodiment, the response request can comprise a notification to the online service to mitigate sending any more outage requests for a desired period of time. As an example, the response to the request from the online service for service outage details can comprise a request from the outage detection and response service to stop sending service outage requests for a specified period of time (e.g., long enough to recover from the potential overwhelming number of requests received). In this way, for example, the outage detection and response service may be able to handle incoming requests if a number of requests received are reduced.

If the request threshold is not met (NO at 408), a customized message may be returned, which comprises details about the one or more service outages (e.g., as described in FIG. 5). In response to viewing the customized error message, the user may indicate that they wish to receive a notification of outage resolution. For example, the user may select an option in the error message (e.g., 510 of FIG. 5) that requests a resolution notification. At 414, if a resolution notice request is not received (NO at 414), no action may be taken when the service outage is resolved.

If a resolution notice request is received (YES at 414), such as from the user, service outage resolution monitoring can be performed, at 416. As an example, current, active outage data that is pulled for the one or more online services (e.g., 302 of FIG. 3) can be reviewed to determine if the monitored service outage is still listed in the pulled data (e.g., pulled periodically, at desired intervals). Each time the current, active outage data that is pulled, for example, it may be determined whether the monitored service outage is still active (e.g., unresolved), at 418. If the monitored service outage is still active (e.g., outage still persists) (NO at 418), a subsequent list of current, active outage data can be monitored, at 416. If the monitored service outage is no longer active (YES at 418), a notice of service outage resolution can be returned to the online service, at 420, which may inform the user that the service outage has been resolved (e.g., and that the service is once again available).

A system may be devised that can provide for detailed service outage information to be presented to a user of an online service, such as when an error is detected while using the online service. Rather than merely providing a generic error that indicates the user's action cannot be performed, details can be provided that comprise an actual reason for the error, if caused by a detected service outage. Further, a status of the service outage causing the error may be provided, along with possible resolution information, and/or user options for dealing with the error, for example.

Figure 6:
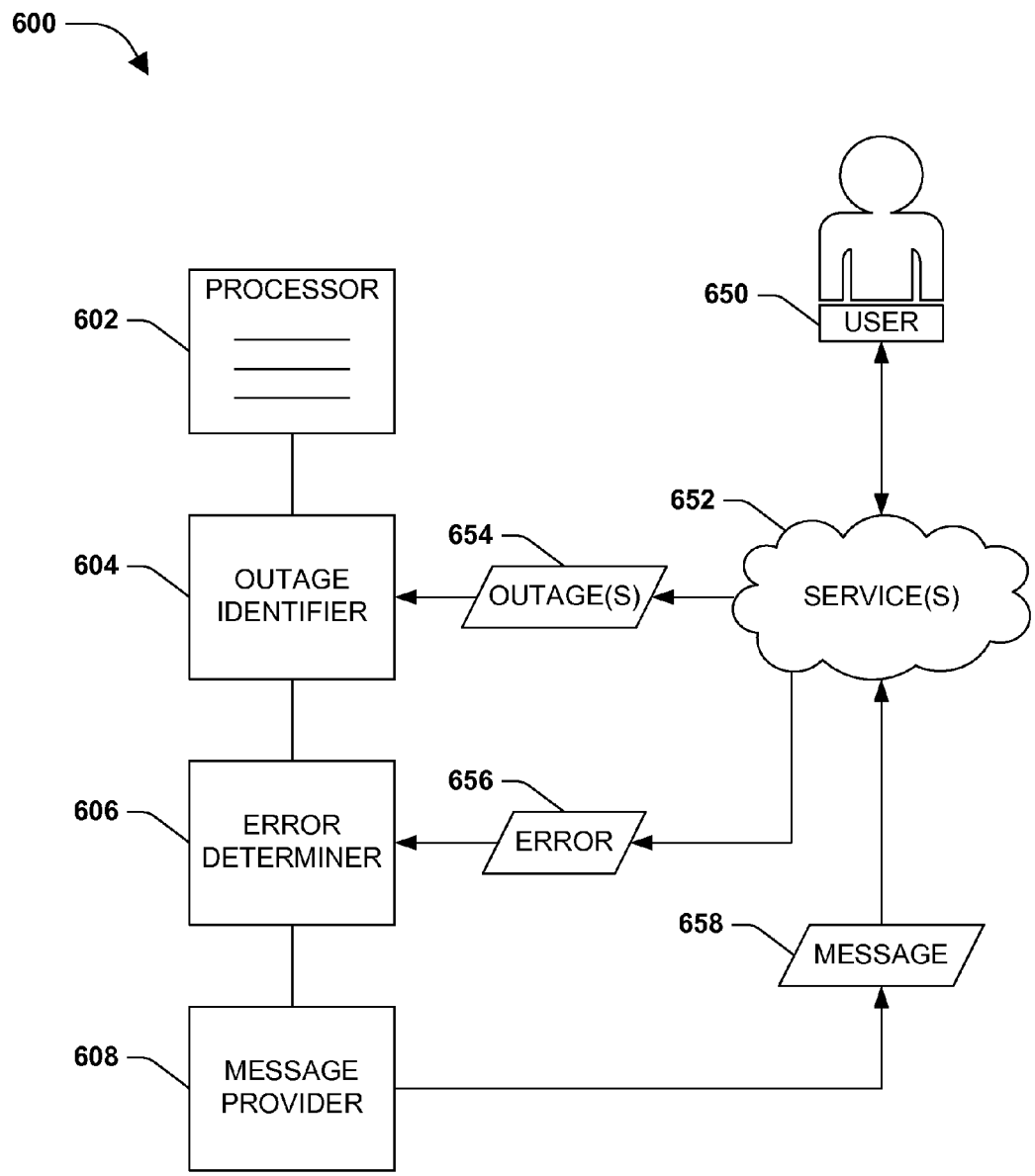
FIG. 6 is a component diagram illustrating an exemplary system for providing a customized service error message to a user of a service.

FIG. 6 is a component diagram illustrating an exemplary system 600 for providing a customized service error message to a user of a service. In the exemplary system 600, a computer-based processor 602 is configured to process data for the system. The processor 602 is operably coupled with an outage identification component 604 that is configured to identify one or more service outages 654 for the service 652. Further, an error determination component 606 is operably coupled with the outage identification component 604, and is configured to determine if an error 656 encountered during a user action is covered by the one or more identified service outages 654.

In the exemplary system 600, a message providing component 608 is operably coupled with the error determination component 606. The providing component 608 is configured to provide the customized service error message 658 to the user 650 based at least upon the one or more identified service outages 654, merely if the error 656 is covered by the one or more identified service outages 654. For example, the outage identification component 604 can identify one or more service outages 654 for one or more services 652. In this example, the error determination component 606 can compare the error 656 to the one or more identified service outages 654 to see if at least one of the one or more identified service outages 654 may have caused the error 656 (e.g., cover the error). If at least one of the one or more identified service outages 654 may have caused the error, the message providing component 608 can provide the customized error message 658, where the message comprises details from the at least one of the one or more identified service outages 654.

Figure 7:
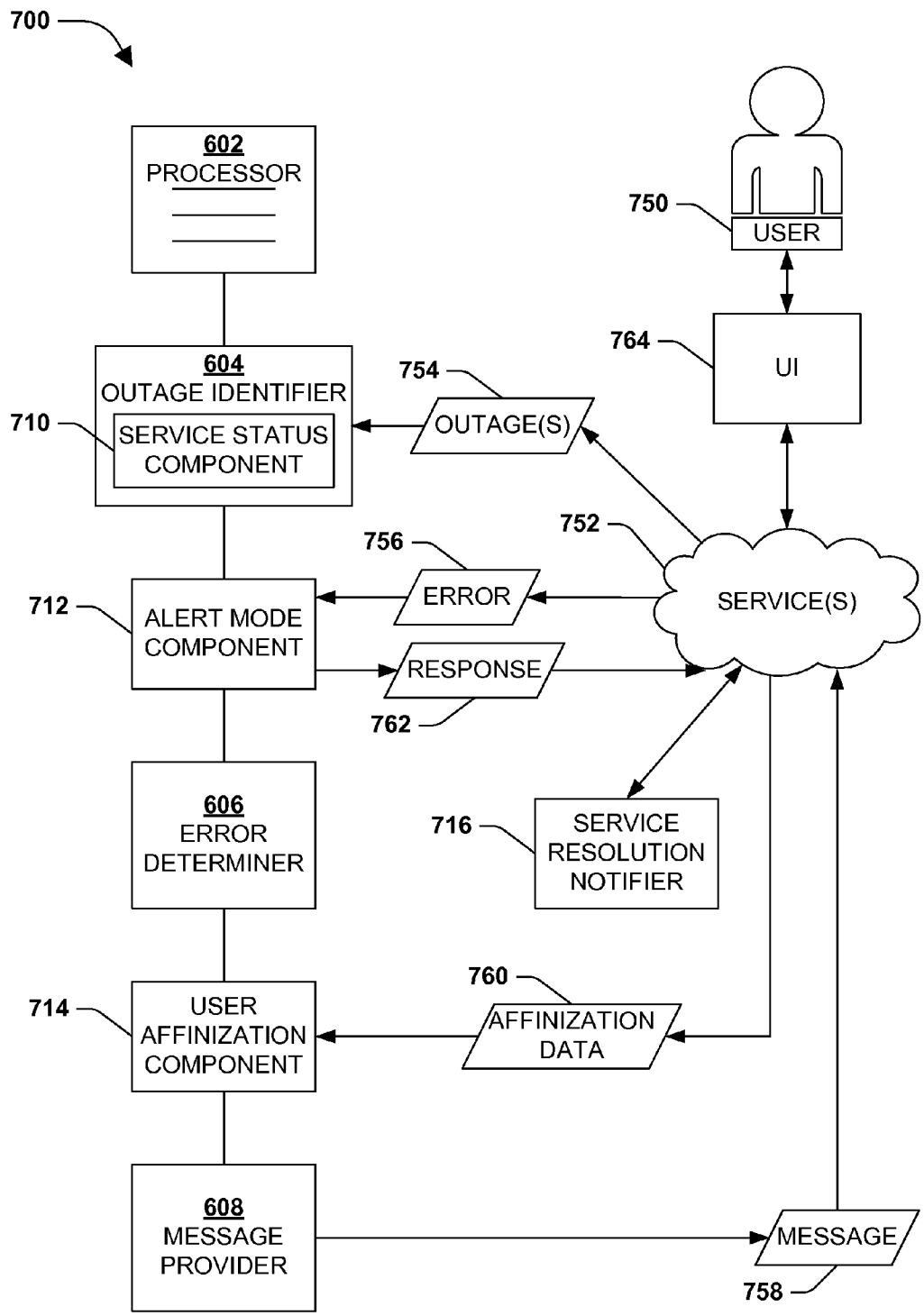
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In this embodiment 700, the outage identification component 604 can comprise a service status component 710. The service status component 710 can be configured to pull information related to one or more active service outages 754 for one or more online services 752, where the one or more online services comprise a service being used by the user 750. Further, the service status component 710 can provide the information related to one or more active service outages 754 to the error determination component 606.

In one embodiment, the error determination component 606 can be configured to receive information related to the error 756 from an error detection component that may be comprised in the service 752. For example, the service 752 may detect an error during a user action related to the service 752, and can send a request comprising the error 756 to the error determination component 606, for example, to determine if the error may be covered by the one or more identified service outages 754.

In the example embodiment 700, an alert mode component 712 may be configured to mitigate an overload of requests for service outage data, such as from the one or more online services 752. The alert mode component 712 may mitigate the overload by returning a notification response 762 to a service requesting the service outage data, where the response comprises a request to mitigate sending an outage request for a specified period of time. Further, the alert mode component 712 may trigger the notification response 762 when an outage request threshold is met, where the outage request threshold can comprise a number of outage requests received over a defined period of time (e.g., requests per second (RPS).

A user affinitization component 714 can be configured to identify affinitization data 760 for the user 750. The affinitization data 760 may comprise a location of service related data utilized by the user and/or a location of one or more portions of the service utilized by the user. Further, the user affinitization component 714 can be configured to determine whether the user is affected by the one or more service outages based at least upon the affinitization data 760. Additionally the user affinitization component 714 can allow the customized service error message 758 to be provided to the user 750 (e.g., via the message providing component 608) merely if the user is affected by the one or more service outages.

In one embodiment, the message providing component 608 can be configured to provide the customized error message 758 to the service 752 so that the message may be displayed to the user 750 in a service-based user-interface 764 (UI). For example, the service 752 being used by the user 750 when the error 756 occurred can display the customized error message 758 in the UI 764 comprised in the service 752, such that the details of the service outage that are affecting the user action may be displayed in-line with content from the service UI 764. A service resolution notification component 716 may be configured to provide a notification of service outage resolution to the user, for example, if the user requested notice of outage resolution (e.g., or the service resolution notification component 716 may provide the resolution notice by default unless requested not to by the user). It this way, the user may receive a notification of when the service is again available for use.

Figure 8:
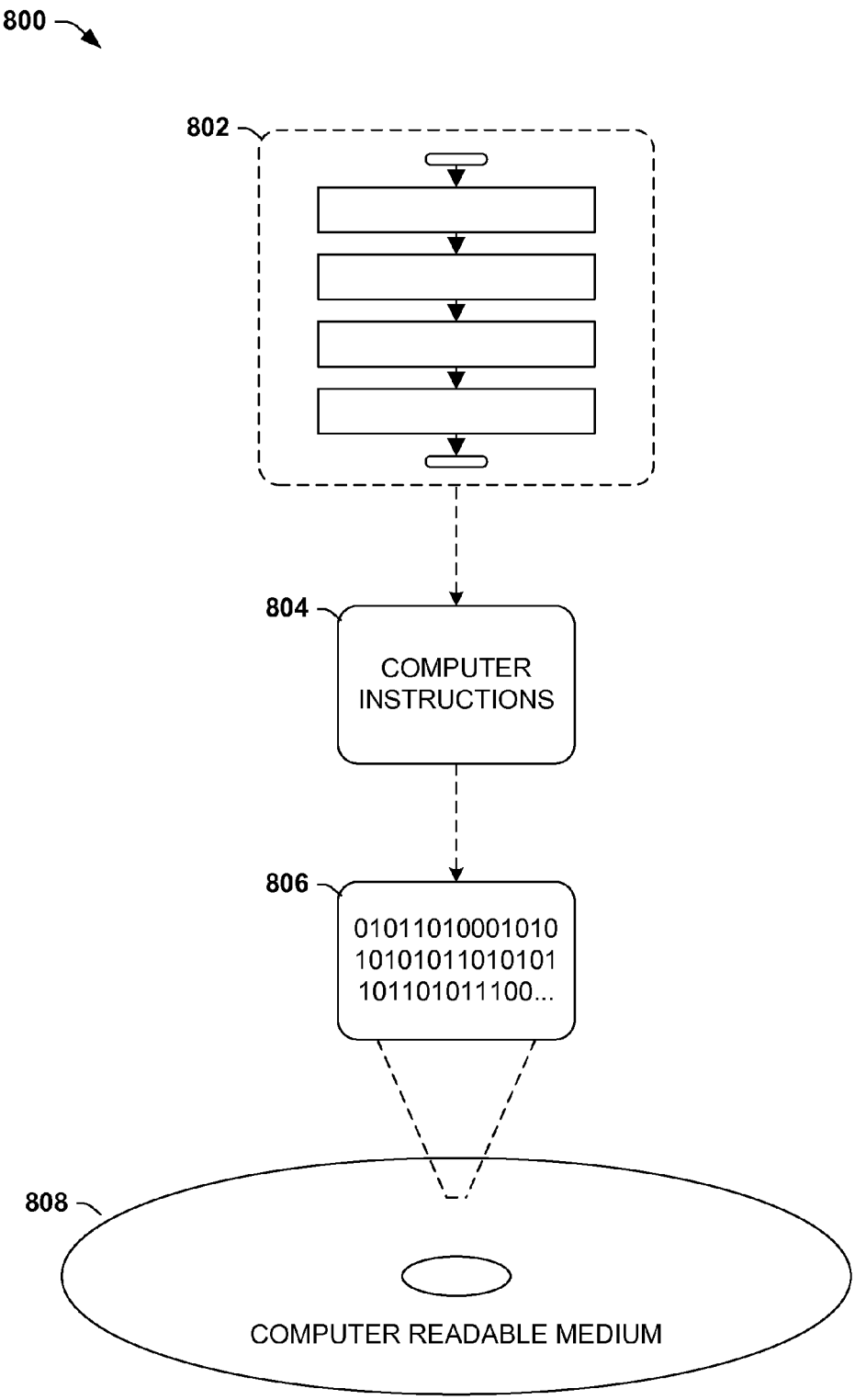
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 200 of FIG. 2, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
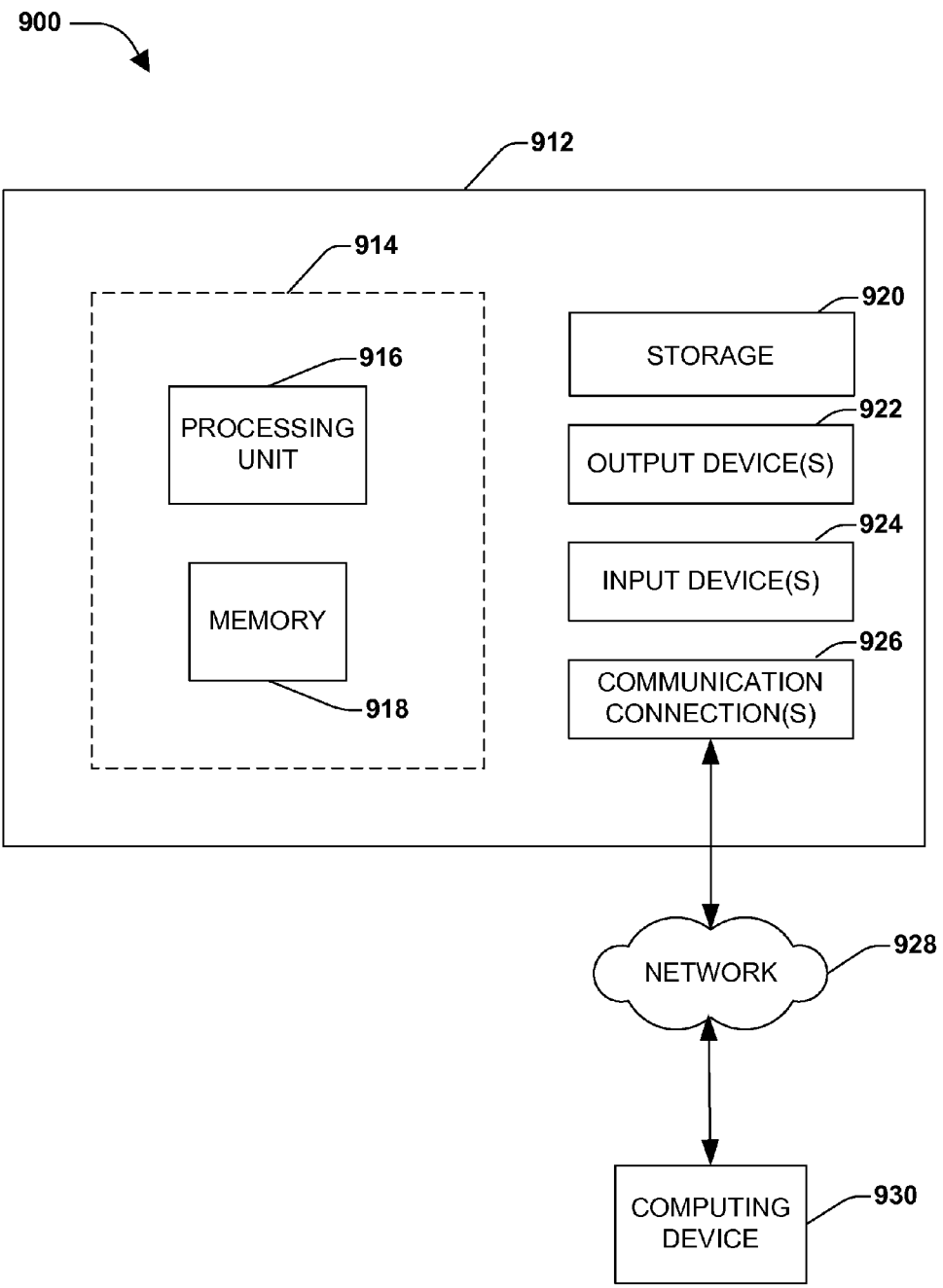
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B and/or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for providing a customized service error message to a user of a service, comprising:
  determining that a service outage corresponding to the service is comprised within a directory;
  receiving an indication of an error encountered during a user action by the user;
  comparing the service outage with one or more details of the error encountered during the user action by the user, the comparing performed on a server that is associated with the service and connected via a network to the user, the service outage due to at least one of maintenance of hardware, maintenance of software, upgrading of hardware or upgrading of software;
  determining if the error is attributable to the service outage or if the error is attributable to a local issue associated with the user based upon the comparison; and
  providing the customized service error message to the user if the error is determined to be attributable to the service outage and if an outage request threshold is determined to not be met, the outage request threshold corresponding to a number of outage requests that are received over a period of time, at least a portion of the method performed by a processing unit.

2. The method of claim 1, the service outage due to the maintenance of hardware.

3. The method of claim 1, the service outage due to the maintenance of software.

4. The method of claim 1, the service outage due to the upgrading of hardware.

5. The method of claim 1, comprising providing the customized service error message to the user merely if the user is affected by the service outage.

6. The method of claim 5, comprising determining whether the user is affected by the service outage using affinitization data for the user.

7. The method of claim 5, comprising determining whether the user is affected by the service outage, comprising identifying one or more of:
  a location of service related data utilized by the user; or
  a location of one or more portions of the service utilized by the user.

8. The method of claim 5, comprising determining whether the user is affected by the service outage, comprising determining that the service outage impacts one or more of:
  a location of service related data utilized by the user; or
  a location of one or more portions of the service utilized by the user.

9. The method of claim 1, comprising one or more of:
  receiving a request from the service for service outage related data for the service; or
  returning the service outage related data to the service.

10. The method of claim 9, comprising returning a response request to the service notifying the service to mitigate sending requests for service outage related data.

11. The method of claim 1, comprising sending a message different than the customized service error message if the outage request threshold is determined to be met.

12. The method of claim 1, comprising providing a notification of service outage resolution to the user.

13. A system, implemented at least in part via a processing unit, for providing a customized service error message to a user of a service, comprising:
  a first component configured to receive an indication of an error encountered during a user action by the user;
  a second component configured to compare a service outage for the service with one or more details of the error encountered during the user action by the user, the service outage due to at least one of a hardware failure, a software failure, maintenance of hardware, maintenance of software, upgrading of hardware or upgrading of software;
  an error determination component configured to determine if the error is attributable to the service outage or if the error is attributable to a local issue associated with the user based upon the comparison; and
  a message providing component configured to provide the customized service error message to the user if the error is determined to be attributable to the service outage and if an outage request threshold is determined to not be met, the outage request threshold corresponding to a number of outage requests that are received over a period of time.

14. The system of claim 13, the second component comprising a service status component configured to perform one or more of:
  pull information related to one or more service outages for one or more online services; or
  provide the information related to one or more service outages to the error determination component.

15. The system of claim 13, the error determination component configured to receive information related to the error from a service-based error detection component.

16. The system of claim 13, the message providing component configured to provide the customized service error message for display to the user in a service-based user-interface (UI).

17. The system of claim 13, comprising a user affinitization component configured to perform one or more of:
  identify affinitization data for the user, comprising one or more of:
    a location of service related data utilized by the user; or
    a location of one or more portions of the service utilized by the user;
  determine whether the user is affected by the service outage based upon the affinitization data; or
  allow the customized service error message to be provided to the user merely if the user is affected by the service outage.

18. The system of claim 13, comprising an alert mode component configured to mitigate an overload of requests for service outage related data by:
  returning a notification to a service requesting service outage related data to mitigate sending a request for service outage related data for a second period of time.

19. The system of claim 13, comprising a service resolution notification component configured to provide a notification of service outage resolution to the user.

20. A computer readable medium, excluding signals, comprising computer executable instructions that when executed via a processing unit perform a method for providing a customized service error message to a user of a service, comprising:
  determining that a service outage corresponding to the service is comprised within a directory;

receiving an indication of an error encountered during a user action by the user;

comparing the service outage with one or more details of the error encountered during the user action by the user, the service outage due to at least one of maintenance of hardware, maintenance of software, upgrading of hardware or upgrading of software;

determining if the error is attributable to the service outage or if the error is attributable to a local issue associated with the user based upon the comparison; and providing the customized service error message to the user if the error is determined to be attributable to the service outage.

* * * * *